(12) United States Patent
Jones

(10) Patent No.: US 7,638,047 B1
(45) Date of Patent: Dec. 29, 2009

(54) WATER FILTER HAVING ZEOLITE LAYERS AND ACTIVATED CARBON LAYER

(75) Inventor: Kevin R. Jones, Irwin, PA (US)

(73) Assignee: Cardinal Resources LLC, Pittsburgh, PA (US)

( * ) Notice: Subject to any disclaimer, the term of this patent is extended or adjusted under 35 U.S.C. 154(b) by 0 days.

(21) Appl. No.: 12/119,094

(22) Filed: May 12, 2008

Related U.S. Application Data

(60) Provisional application No. 60/917,128, filed on May 10, 2007, provisional application No. 60/917,126, filed on May 10, 2007.

(51) Int. Cl.
  *C02F 9/00* (2006.01)

(52) U.S. Cl. .................. 210/252; 210/261; 210/262; 210/264; 210/283; 210/290

(58) Field of Classification Search .................. 210/252, 210/261–262, 264, 283, 290
See application file for complete search history.

(56) References Cited

U.S. PATENT DOCUMENTS

| 7,413,663 | B2 * | 8/2008 | Rajan et al. .................. 210/682 |
| 7,491,337 | B2 * | 2/2009 | Karaman ..................... 210/723 |

* cited by examiner

*Primary Examiner*—Chester T Barry
(74) *Attorney, Agent, or Firm*—Christy G. Rothwell, Esq; Cohen & Grigsby, P.C.

(57) ABSTRACT

A water filter for filtering raw water into potable water having a series of media layers in the following order: 1) sand to gravel or coarse silica; 2) zeolite; 3) activated carbon; 4) a second layer of sand to gravel or coarse silica; and 5) a second layer of zeolite is disclosed. Optionally, the filter further has a ceramic media layer, which may have a reactive coating such as calcium hypochloride. Further options include ferruginous latertic clay spheres (FLCS) or iron oxide brick particles, at least one grid, which may be charged, and/or at least one sand arch. The media layers are contained within at least one vessel. A water filtration system and methods for filtering raw water into potable water are also disclosed.

6 Claims, 4 Drawing Sheets

US 7,638,047 B1

WATER FILTER HAVING ZEOLITE LAYERS AND ACTIVATED CARBON LAYER

CLAIM OF PRIORITY

This application claims priority to U.S. Provisional Application Nos. 60/917,128 and 60/917,126, filed on May 10, 2007.

FIELD OF THE INVENTION

Embodiments of the present invention generally relate to a water filter and a water filter system for raw water filtration and methods of filtering raw water into potable water.

BACKGROUND OF THE INVENTION

The following background information is provided to assist the reader to understand embodiments of the invention disclosed below and the environment in which they may be used. The terms used herein are not intended to be limited to any particular narrow interpretation unless clearly stated otherwise, either expressly or impliedly, in this document.

Over one billion people worldwide lack access to potable water. Water-borne diseases are one of the leading causes of disease and death in the world. Water systems in developing economies and emerging countries fail about 50% of the time due to complexity of operations, operation and maintenance costs, expense, burdensome to use, not portable, and requiring chemicals and energy. In addition, industries that locate operations in developing and emerging countries are seeking sustainable cost effective water supply systems to provide water to their facilities and the workers' communities. In developed economies, consumers are seeking a more environmentally sustainable life style which includes using alternative energy and fewer chemicals in products, including water. In dealing with water scarcity, there is an increasing demand for rain water and industrial wastewater filtration and recycling using sustainable systems that do not rely on additional chemical treatment or extensive maintenance.

There are multiple approaches to providing clean drinking water such as filtration, ultra filtration, UV oxidation, and chemical disinfection. These approaches are generally small scale, rely on traditional power sources such as generators or an available power grid, or address only parts of the needs for water purification.

Other transportable systems provide clean drinking water using traditional energy sources that produce greenhouse gases and other pollutants. In addition, treatment units that rely on portable hydrocarbon based power generation increase the risk of contamination of the water source. Other solar powered units use combinations of filtration approaches that require the use of disposable filters and UV oxidation to provide disinfection. This type of approach is not well suited to developing economies and sustainable development as it requires significant maintenance work, imported materials, and no residual disinfection in the water. Thus, there is a world-wide need for sustainable water filtration systems with low cost and low maintenance and that uses alternative energy sources.

SUMMARY OF THE INVENTION

In one embodiment, the present invention is directed to a water filter for filtration of raw water into potable water having a series of media layers in the following order: 1) sand to gravel or coarse silica; 2) zeolite; 3) activated carbon; 4) a second layer of sand to gravel or coarse silica; and 5) a second layer of zeolite. Optionally, the filter further has a ceramic media layer. Further options include ferruginous lateritic clay spheres (FLCS) or iron oxide brick particles, at least one grid, which may be charged, and/or at least one sand arch. In an embodiment, the media layers are contained in at least one pressure vessel having an inlet and an outlet. In a preferred embodiment, the media layers are separated into two pressure vessels with the first vessel containing the sand to gravel or coarse silica, the zeolite, and the activated carbon, and the second vessel containing the second layer of sand to gravel or coarse silica, the second layer of zeolite, and optionally the ceramic media layer. In another embodiment, the FLCS or iron oxide brick particles are mixed in with the zeolite layers and graded into the ceramic media layer. In a further embodiment, the ceramic media layer has a reactive coating, such as calcium hypochloride.

In another embodiment, the present invention is directed to a water filtration system for filtration of raw water into potable water. The filtration system contains an energy source, a supply pump, a primary screen, a flexible water line, a pressure tank, at least one container, a filter, a flexible bladder, an exit line, a control suite, an inverter, at least one alarm, and at least one battery. In a preferred embodiment, the system contains a filter as described herein. In another preferred embodiment, the energy source is an alternative energy source. In a further optional embodiment, the system contains a chlorine mix tank. The chlorine may be produced via a brine tank and electrolysis. In another embodiment, the system has light emitting diodes.

In another embodiment, the present invention is directed to a method of filtering raw water into potable water. The method includes filtering the water through a series of media layers in the following order: 1) sand to gravel or coarse silica; 2) zeolite; 3) activated carbon; 4) a second layer of sand to gravel or coarse silica; and 5) a second layer of zeolite. Optionally, the water is further filtered through a ceramic media layer, which may have a reactive coating such as calcium hypochloride. Further additional options include filtering the water through FLCS or iron oxide brick particles, at least one grid, which may be charged, and/or at least one sand arch. In another embodiment, chlorine is added to the filtered water.

Those and other details, objects, and advantages of the present invention will become better understood or apparent from the following description and drawings showing embodiments thereof.

BRIEF DESCRIPTION OF THE DRAWINGS

The accompanying drawings illustrate examples of embodiments of the present invention.

DETAILED DESCRIPTION

In all of its embodiments and related aspects, the present invention generally pertains to water filtration systems used to convert raw water to drinking water through filtration of particulates and disinfection. Various embodiments of the present invention relate to a water filtration system, a water filter, and methods for water filtration.

Various embodiments of the present invention are directed to a water filter comprising a series of media layers that provides drinkable water with substantially zero turbidity, i.e. less than 5 NTUs, substantially no solid particles, and residual disinfection without the use of pre-treatment chemicals. In one embodiment, the media layers are contained within at least one pressure vessel. In an example, the filter is a pair of vessels. In another example, the filter is two or more pairs of vessels used in alternates for continuous flow of water. The media layers include layers of sand, gravel, coarse silica, and activated carbon. Optional, additional layers include a ceramic media, which may have a reactive coating such as calcium hypochloride, and ferruginous lateric clay spheres (FLCS) and/or iron oxide brick particles. In another option, at least one layer may be separated from another layer by a grid, which may be charged, and/or a sand arch.

Figure 1:
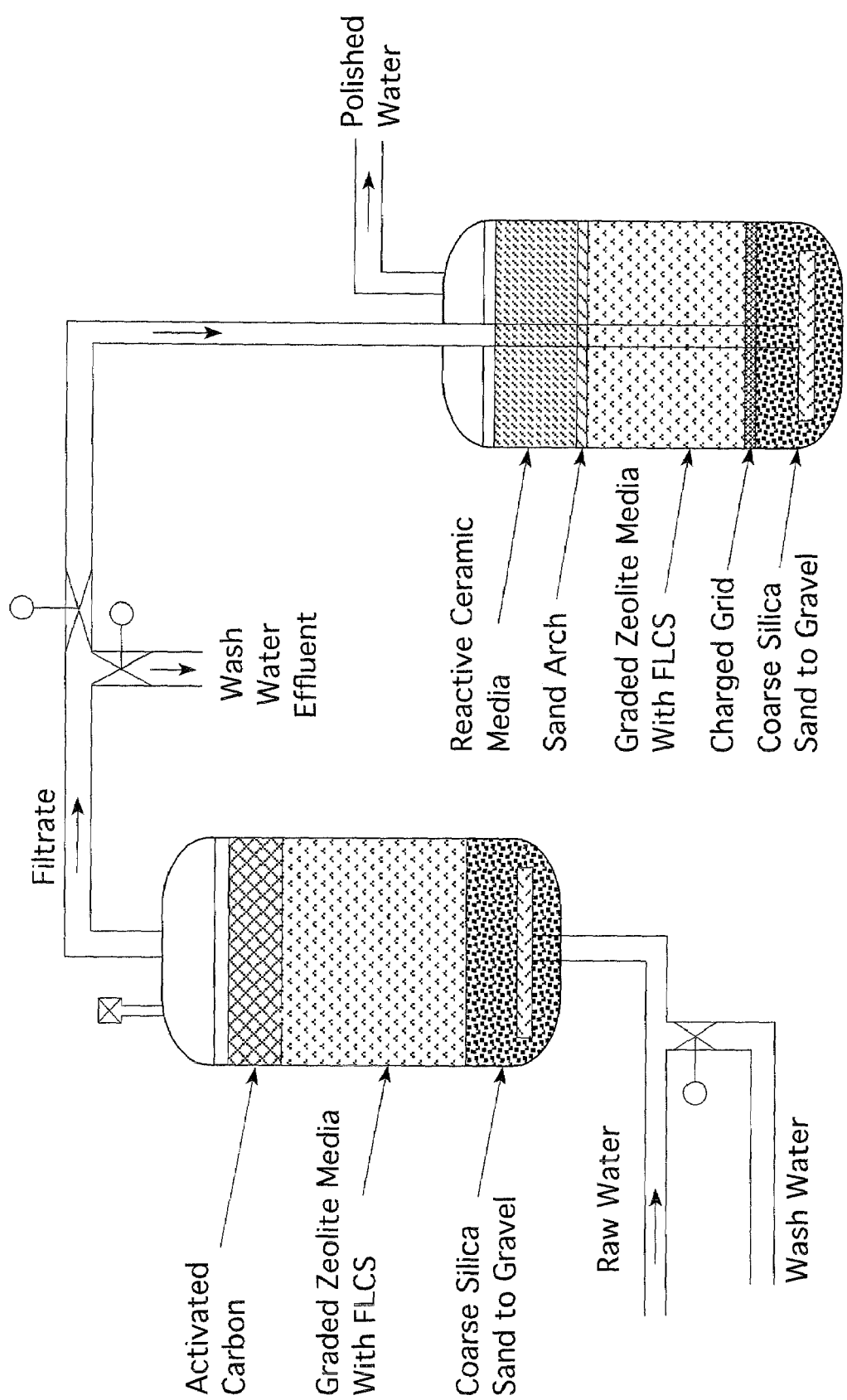
FIG. 1 is a schematic of a water filter.

In one embodiment, the filter is comprised of at least one common pressure vessel having an inlet and an outlet. Preferably, but not required, the vessel is in a vertical arrangement. See FIG. 1. The inlet and outlet of the vessel are provided with threaded fitting and piping for the distribution of raw water, the discharge of clean water, the distribution of treated water for cleaning, and recharge fluids. At the bottom of each vessel the influent water, either raw water or partially processed water, passes through a screened distribution frame at the bottom which allows for the even distribution of water into the individual vessels. The size of the vessels varies based upon the desired flow of water. In an example, a standard volume of approximately 6 cubic feet will treat approximately 10 gallons of water per minute on a constant basis. The filters are designed to treat the desired flow for a period of five years before replacement of the media.

The interior of the vessel is partially filled with multiple filter medias in layers. The filter medias include, without limitation, sand, gravel, coarse silica, zeolite, activated carbon, and optionally ceramic media, which may have a reactive coating, such as calcium hypochloride, and FLCS and/or iron oxide brick particles. In the example of a filter having two vessels, the layers in the first vessel are maintained by particle size, density, and flow controls. Optionally, the layers may be separated by a grid or sand arch to maintain and ensure separation of the layers. In a preferred example, the first layer of the first vessel is a layer of coarse silica or similar sand to gravel sized particles located at the bottom of the vessel. See FIG. 1. The primary objective of this layer is to remove large particles and distribute the water. The next layer in contact with the water is comprised of natural zeolites, an aluminum silicate mineral that has a unique open structure with a high cation exchange capacity and an ability to physically capture micron range particles within the matrix. Optionally, the natural zeolites are mixed with FLCS and/or iron oxide brick particles. The zeolite layer will physically filter particles down to the 20 micron range and capture particles in the 0.45 micron range to produce clear or polished water. The FLCS layer provides for the removal of fluoride as well as limited reactive dechlorination of halogenated organics. The next layer after zeolite is comprised of graded activated carbon and bone charcoal particles for absorbing organic compounds, for example such as common volatile and semivolatile organic compounds, tannins, fluoride, arsenic, and metals that may be present in the raw water. These organic compounds can affect the taste, odor, color and suitability of the water for drinking as well as interfere with disinfection.

In a two vessel filter, the water then passes to the second vessel. The first layer in the second vessel comprises a coarse silica or similar sand to gravel sized particles to promote even distribution of the water for treatment and during filter wash cycles. In a preferred embodiment, the first and second layer is separated by a grid to which a low electrical charge may be applied to give a charge to particles passing through the layer. These charged particles are more easily absorbed on the zeolite which forms the next layer in the second vessel. The zeolite layer is similar to the first vessel with a similar function, i.e. to remove particles down to the 20 micron size through filtration that occurs due to the tortousity of the flow path and through the capture of particles down to 0.45 micron size through physical capture and the cation exchange capacity of the zeolite. Optionally, FLCS and/or iron oxide particles are also mixed in this layer. Preferably, a grid or sand arch is between the zeolite and the optional next layer. The next layer comprises an optional FLCS grading into a combination of spherical beads and angular particles of manufactured ceramic with a 0.45 micron porosity and a further optional reactive coating, such as calcium hypochloride silicon. The coating of the particle is designed to release free chlorine to the water stream which begins the disinfection process by destroying virus cysts and biologic agents. The water then exits the vessel for use.

The filters are designed to not require media replacement for at least five years. Media replacement will vary based on the system in which the filters are used. If the filters are used in grey water recycling, industrial recycling, or a rain water type filtration system, the life of the filters would be extended beyond five years. The filters can be designed to meet required base flow needs, such as for example for a home, office, or community, by scaling the size of the filters, by scaling the size of the vessels within the filter, by utilizing multiple vessels within a filter, by utilizing multiple filters, or a combination thereof.

Routine maintenance consists of backwashing the filters to remove captured particles and periodically recharging the zeolite in the first vessel. Backwashing is accomplished by having polished water flow upward through the filter at a flow rate sufficient to fluidize media within the filter and flush the captured sediment out through a valve assembly for direct discharge. The backwash cycle continues until substantially all the particles captured in the process are removed from the media. To regenerate the zeolite, a weak salt solution is first rinsed through the backwash cycle followed by a polished water rinse. The activated carbon layer and ceramic layer are designed to have at least a 5 year life. If necessary these layers can be accessed through the top of the vessel valve assembly. Optionally, more than one filter and/or multiple vessels within the filters may be in place for continuous water filtration by alternating filters or vessels instead of stopping filtration for maintenance.

Figure 2:
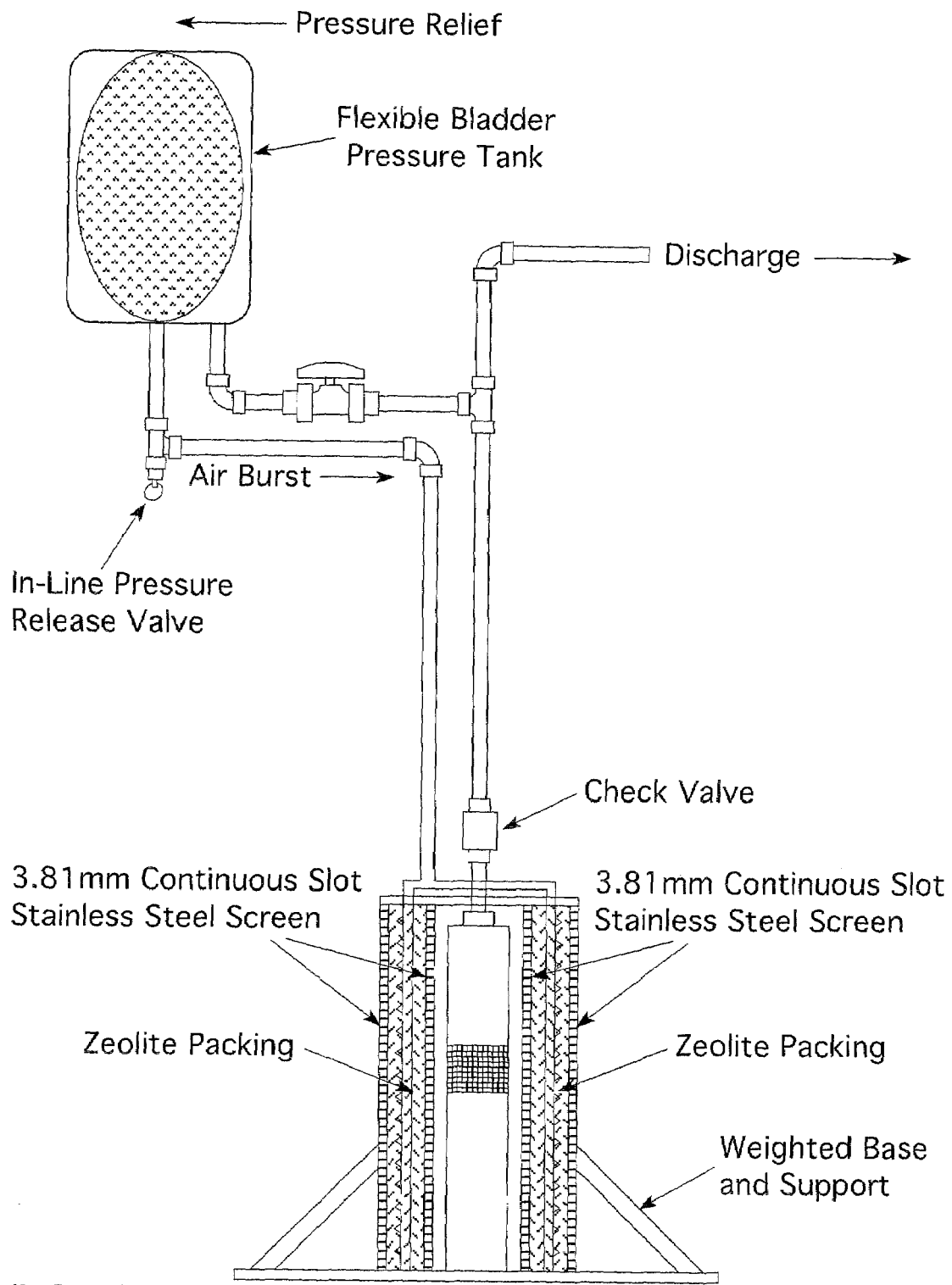
FIG. 2 is a general schematic of a water filtration system.
Figure 3:
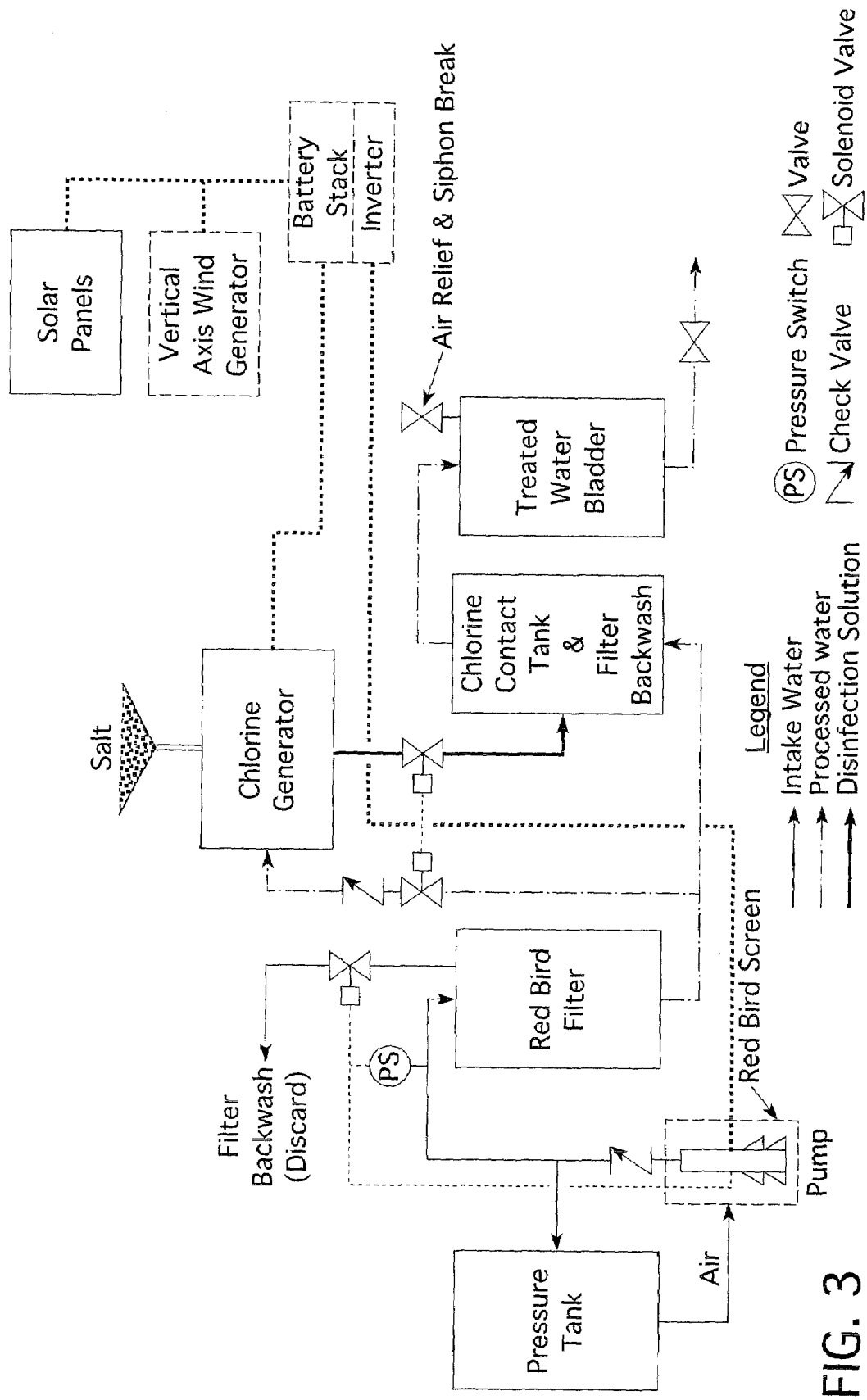
FIG. 3 is a general process flow diagram of the system.

Various embodiments of the present invention relate to a system for water filtration. In one embodiment, raw water is pumped from the source to the treatment unit via a flexible water line. A by-pass line feeds a pressure tank. Periodically an air burst is automatically triggered to clean a primary screen at the supply pump. The screen and a packing provide the initial removal of large particles as well as bacteria and virus sized particles. The raw water continuously enters a container through the upper valved opening and flows under pressure through at least one filter in the container for the removal of suspended sediment and particles. See FIGS. 2 and 3. In a preferred embodiment, the filter is at least one filter disclosed above. Optionally, from the filter, the water enters a mix tank where chlorine solution is added as needed based on the automated measurement of chlorine residual in the water. The chlorine solution may be provided by delivering an electrical current in bursts to a brine tank, i.e. via electrolysis. From the mix tank the water is pumped to a flexible bladder or other container which provides a pressurized system. Backflow from the bladder is prevented by a check valve. When water is needed, a valve is opened which allows water to flow from the bladder to the exit line. The chlorination of the water is designed to provide a chlorine residual equivalent to USEPA and EU standards for the effective treatment of biologic contaminants without having an excess residual. Using the filter disclosed herein with this system provides a two-step chlorination process.

An alternative energy source, such as solar panels, vertical axis wind generators, micro-hydropower turbines, or a combination thereof, is connected to the controls, an inverter, and to a set of batteries for power storage so that the system can operate continuously. The system could also operate from generated electricity. The control suite controls a supply motor, at least one transfer pump, and an optional electrolysis unit. Alarms are provided for low flow conditions, tank levels, low water supply at the supply pump, and for the failure of the electrolysis unit. Relays are provided to control the start sequence of the system and to automatically transfer the water through the system. The system is capable of remote monitoring including stops, restarts, and error diagnosis. Using configured light emitting diodes, area lighting is provided within the container and outside of the container.

Some of the advantages of the system of the present invention, particularly when used with the filters disclosed herein, include, for example, the ability to provide potable water that meets applicable USEPA drinking water standards without the use of pretreatment chemicals, the ability of the system to operate without significant operator interaction, the preconfigured set up and operation of the system that allows it to be used in settings ranging from a remote war zone to the heart of a city within hours of its deployment, and an integrated electronic control suite that minimizes power demands to allow for the use of alternative energy in an integrated system.

In addition, various embodiments of the present invention relate to methods of water filtration. The method includes filtering raw water through a series of layers of sand, gravel, coarse silica, zeolite, activated carbon, and optionally ceramic media, which may have a reactive coating, and FLCS. In a preferred embodiment, the method comprises filtering raw water through the series of layers in the following order: 1) sand to gravel or coarse silica, 2) zeolites, 3) activated carbon, 4) a second layer of sand to gravel or coarse silica, 5) a second layer of zeolites, and 6) optionally ceramic media, preferably having a reactive coating, such as calcium hypochloride silicon. Optionally, FLCS and/or iron oxide brick particles is mixed with the zeolite media and/or graded into the ceramic media. Optionally, at least one layer is separated from another by a sand arch and/or grid. Preferably, a charged grid separates the second layer of coarse silica or sand to gravel and the second layer of zeolite, and a sand arch separates the second layer of zeolite and the ceramic media. In a preferred example, the method includes filtering the water through two vessels housing the layers of media with the first vessel filtering the water through sand to gravel or coarse silica, then a zeolite layer, and finally an activated carbon layer, and the second vessel filtering the water through sand to gravel or coarse silica, then a zeolite layer, and finally an optional ceramic media. Optionally, after filtering, the method includes adding a chlorine solution, such as through electrolysis of a brine tank, to the water to provide residual disinfection.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

EXAMPLES

The filters disclosed herein and utilizing a pair of vessels comprising the filter medias were used in a field study to treat water from a mine for bacteriological agents, organic compounds, metals, and radionuclides. Data collected over a two month time period documented the reduction of the constituents of concern to below detection limits (and U.S.EPA Maximum Contaminant Limits) and the reduction in turbidity to less than 5 NTUs.

Figure 4:
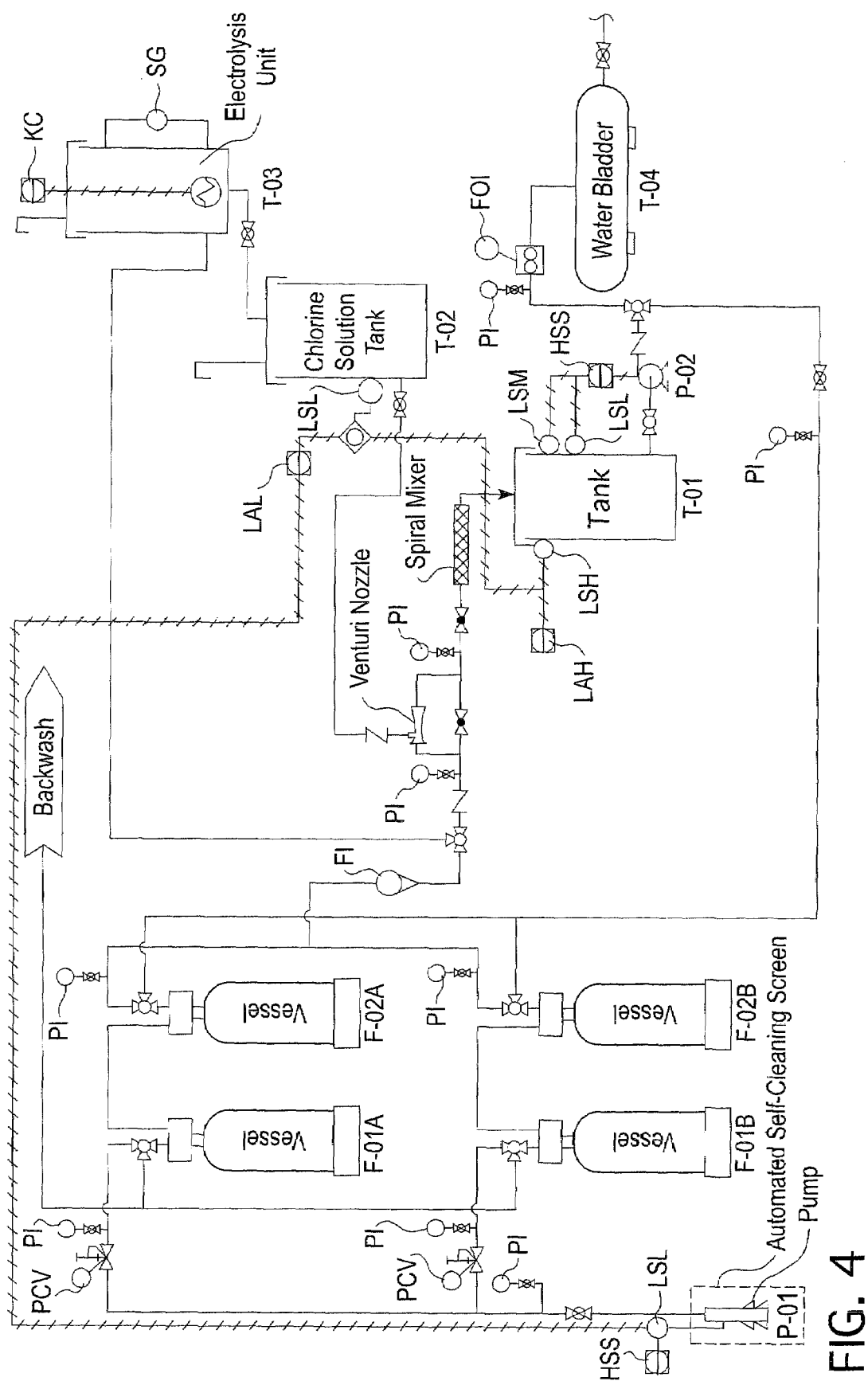
FIG. 4 is a process flow diagram of the system in one embodiment.

An integrated solar, or other alternative energy powered transportable water treatment system designed to function in a setting with minimal infrastructure or areas with the application of green technologies is disclosed at a scale that is capable of providing a community. The integrated, self-contained system is housed in a 20 foot intermodal container or similar shipping container that also forms the housing for the treatment works. The system consists of a self-cleaning pump unit that draws in raw water from either a groundwater or surface water source. See FIG. 4. The water is transferred to a container housing the treatment system and enters through a valved opening near the top of the container. The water flows through a media filter as disclosed herein in an upflow direction comprising two vessels placed in series. Preferably, the filter comprises more than one pair of vessels that can be alternated for continuous filtering. The water passes through the filter and enters a contact tank where a chlorine solution, which may be provided through electrolysis of a brine tank, is mixed with the filtered water to provide disinfection. The treated water is then transferred to a storage bladder and from the bladder to a valved outlet near the base of the container.

A frame to hold a water storage bladder and the photovoltaic cells is erected on the top of the container to provide power to the entire water system, the storage batteries, and area lighting light emitting diodes. An inverter is also present to provide a power source for other equipment as needed.

To use the invention, the intermodal container or similar structure, which contains the partially assembled system is delivered to a site and oriented to provide the highest degree of sunlight to the photovoltaic panels. The roof frame is removed from the container and assembled on the roof of the container. The empty flexible bladder is placed within the roof frame and connected to the water treatment system. The photovoltaic panels are bolted to the frame, grounded, and wired to the storage batteries and control panel. The batteries then begin to charge. The supply pump and housing containing the cleaning system and run-dry protection is placed in the water supply, the power cord connected to the system control panel by locking plugs, and the flexible water line connected from the supply pump to the valved inlet to the treatment system. The pump is turned on and the filters flooded and trapped air released from the filter housing. The brine tank for the electrolysis cell is filled. The electrolysis cell and sensors are energized to prepare for disinfection. Filtered water is pumped to the contact tank and mixed with the chlorine solution at a rate regulated by an on-line probe. Filtered and disinfected water is then pumped to the bladder which is equipped with an air bleed for degassing. Water is then delivered to the user via a valved outlet pipe.

The system provides potable water in many different situations, including without limitation: to any user that desires to have water produced using sustainable technologies, including solar power and limited chemical addition; in remote areas, developing countries, and areas lacking infrastructure or areas where the infrastructure has been damaged by conflict or natural disaster; to municipalities and communities where the water supply is impacted by natural disaster, maintenance activities, terrorist attacks, or other activities that disrupt provided water supplies; and industries and/or developments that are using solar powered approaches to reduce green house gas emissions or as part of their sustainability programs. Furthermore, the system provides community lighting through the use of highly efficient configured light emitting diodes in areas lacking infrastructure.

The present invention has been described with reference to specific details of particular embodiments thereof. It is not intended that such details be regarded as limitations upon the scope of the invention except insofar as and to the extent that they are included in the accompanying claims.

What is claimed is:

1. A water filter for filtration of raw water into potable water, the filter comprising a series of media layers in the following order:
   i. sand to gravel or coarse silica;
   ii. zeolite;
   iii. activated carbon;
   iv. a second layer of sand to gravel or coarse silica; and
   v. a second layer of zeolite.

2. The water filter of claim 1, further comprising a ceramic media layer.

3. The water filter of claim 1, further comprising a plurality of ferruginous latertic clay spheres (FLCS) or iron oxide brick particles.

4. The water filter of claim 1, wherein at least one layer is separated from another layer by at least one of a grid and a sand arch.

5. The water filter of claim 1, wherein the filter has a first vessel and a second vessel;
   wherein the first vessel comprises a series of media layers in the following order:
      i. sand to gravel or coarse silica;
      ii. zeolite; and
      iii. activated carbon;
   and wherein the second vessel comprises a series of media layers in the following order:
      iv. sand to gravel or coarse silica; and
      v. zeolite.

6. The water filter of claim 5, wherein the second vessel further comprises a ceramic media layer.

\* \* \* \* \*